3,082,069
METHOD OF PREPARING CARBON DISULFIDE AND HYDROGEN SULPHIDE
Arthur Ashton Banks, Widnes, England, assignor to Imperial Chemical Industries Limited, London, England, a corporation of Great Britain
No Drawing. Filed Nov. 2, 1959, Ser. No. 850,023
Claims priority, application Great Britain Nov. 12, 1958
8 Claims. (Cl. 23—206)

This invention relates to a process for the manufacture of carbon disulphide by the catalysed reaction of hydrocarbons with sulphur and more particularly to such a reaction wherein the hydrocarbons consist mainly of hydrocarbons containing at least 5 carbon atoms.

It is known that the manufacture of carbon disulphide with formation of by-product hydrogen sulphide can be effected by reacting hydrocarbon gases with sulphur in the vapour form at elevated temperatures in the presence of a catalytic material. Catalysts which permit the formation of carbon disulphide include such materials as activated alumina, silica gel and compounds of metals of groups V, VI, VII and VIII of the periodic table. In particular, various oxides or sulphides of iron, molybdenum and vanadium supported on activated alumina, silica gel or other porous carriers have been disclosed as useful in catalysing the reaction of hydrocarbons with sulphur.

Now with a hydrocarbon feed consisting of methane and/or ethane the process is not complicated by side-reactions and at temperatures of 350° C. to 750° C., particularly 500° C. to 700° C. in the case of methane, carbon disulphide may be produced in useful yields together with by-product hydrogen sulphide. However, it has always been recognized by workers in this field that when the methane or ethane contains even a minor proportion of hydrocarbons having 3 or more carbon atoms in the molecule, the reaction is complicated by the formation of tarry material or polymeric sulphur-containing compounds formed by the breakdown and interaction with sulphur of the said higher hydrocarbons. When using such a starting material the activity of the catalyst declines, there is a reduced conversion to the product and there is contamination of the product and of the unreacted sulphur which is normally recycled. Natural gases consisting essentially of methane and also containing a few percent, say a total of 5% $C_3$ and $C_4$ hydrocarbons have normally been regarded as border-line cases for use in such a reaction, since even they cause severe loss in activity of the catalyst with all the complications attendant thereto. Strenuous attempts have been made with some success to overcome these problems by refinements such as introducing a proportion of an inert gas such as nitrogen in the hydrocarbon feed, using a stoichiometric excess of sulphur and preheating both reactants while at the same time avoiding premixing of the hydrocarbon feed and sulphur vapour prior to passing them to the reaction zone.

While in the type of process above described it has also been stated that the upper limit for the permissible content of higher hydrocarbons in the starting material can be further extended to include methane or ethane containing amounts exceeding 5% of hydrocarbons containing at least 3 carbon atoms and even to such latter hydrocarbons themselves, the only detailed processes of which we are aware showing the reaction of hydrocarbons consisting essentially of hydrocarbons containing at least 3 carbon atoms relate to a hydrocarbon feed consisting of 94% propane, 2.5% ethane and 3.5% $C_4$ hydrocarbons. However, these processes are complicated in that it is necessary to regenerate the catalyst at frequent intervals to prevent build-up of side reactions reaching an objectionable extent. Thus with the feed gas just mentioned consisting essentially of propane it has been found that evidence of side reaction occurs after only 15 minutes and the catalyst must be re-activated, for example, by treating with sulphur vapour also for a period of 15 minutes. Even with a hydrocarbon gas consisting essentially of methane and analysing 86% methane, 6% ethane, 4% propane, 2% $C_4$ hydrocarbons and 2% pentane and higher hydrocarbons there is evidence of catalyst deterioration in about half an hour and again regeneration is needed and this occupies a similar period of time. An alternative procedure described is continuously to withdraw a substantial proportion of the catalyst, regenerate it in a separate vessel and return it to the process. The temperature used in these processes are in the range 454° C. to 704° C. but tar formation is greater at the higher temperatures even within this comparatively low temperature range.

The teaching is therefore in the catalysed reaction of a hydrocarbon feed with sulphur at the comparatively low temperature of the order of 450° C. to 700° C. wherein the feed consists of or contains a predominant amount of hydrocarbons containing 3 carbon atoms and even similarly with a feed consisting mainly of methane and ethane with only 8% of hydrocarbons having 3 or more carbon atoms, that poor conversions can be expected and that at the best this can only be avoided by repeated regeneration of the catalyst with all the complications attendant thereto.

Very surprisingly we have now found that a hydrocarbon feed which consists mainly of hydrocarbons having at least 5 carbon atoms in the molecule may be reacted in the vapour phase and in the presence of a catalyst at temperatures in the range 700° C. to 950° C. with very high conversion to the required carbon disulphide product over very prolonged periods with comparative freedom from deterioration of the catalyst by deposition of tarr and polymeric sulphur-containing compounds thereon.

According to the present invention therefore a process for the manufacture of carbon disulphide and by-product hydrogen sulphide comprises reacting a preheated vaporised hydrocarbon feed which is liquid at normal atmospheric temperature, which is substantially completely vaporised at a temperature below 200° C. and which consists mainly of hydrocarbons having at least carbon atoms in the molecule with sulphur vapour in the presence of a catalyst, without premixing of reactants prior to a reaction vessel containing the catalyst, the catalyst zone being maintained at a temperature in the range 700° C. to 1300° C.

Very good results are obtained at a reaction temperature in the approximate range 800° C. to 900° C.

The catalyst to be employed may be any one known to catalyse the formation of carbon disulphide by reaction between hydrocarbons and sulphur. By way of example only of catalysts which are capable of catalysing the reaction between hydrocarbons and sulphur and which may be employed in the process of the present invention may be mentioned: molybdenum oxide supported on gamma-alumina, nickel supported on alpha-alumina or on silica gel, chromium with molybdenum oxide supported on gamma-alumina and vanadium oxide supported on corundum; one very suitable catalyst is potassium vanadate supported on silica gel or corundum.

We prefer to use at least the stoichiometric amount of sulphur which is required to convert the carbon content of the hydrocarbon to carbon disulphide and to convert the hydrogen content of the hydrocarbon to by-product hydrogen sulphide.

Various types of hydrocarbons may be used as the hydrocarbon feed providing the feed is liquid at normal atmospheric temperature and that it is substantially com pletely vaporized at a temperature below 200° C. and consists mainly of hydrocarbons having at least 5 carbon atoms in the molecule. Indeed a very suitable hydrocarbon is one consisting mainly of hydrocarbons having at least 6 carbon atoms in the molecule. For the hydrocarbon feed aliphatic, alicyclic and aromatic hydrocarbons may be used. Very good results are obtained with a hydrocarbon feed containing a predominating amount of saturated aliphatic hydrocarbons. One suitable source of hydrocarbons is to be found in low grade petroleum distillates which are unsuitable for specialised uses as motor fuel. Two such petroleum distillates are discribed in Examples 1 and 10 of the specification.

The process of the invention may be operated isothermally or adiabatically. The reaction between hydrocarbons and sulphur is exothermic above about 640° C. and in an adiabatic system wherein the reacting gases are at a temperature in the range 700° C. to 1000° C. the average feed temperature of the reactants should in practice with an efficiently lagged reactor be at least 700° C. If the reaction is carried out isothermally then the reactor should be heated or cooled as may be necessary to maintain the desired reaction temperature. In eithe rcase the sulphur may be superheated to rather above the required average feed temperature and the hydrocarbon feed heated to a lower temperature than the average feed temperature to avoid substantial cracking of the hydrocarbon feed prior to entering the reaction zone.

However, sulphur vapour is extremely corrosive, particularly at high temperatures towards many constructional materials which might be used for preheating the sulphur. It may be desirable therefore to keep the preheating temperature for sulphur vapour as low as possible. According to a further feature of the invention we have now found that useful results may be obtained by carrying out the reaction of hydrocarbons with sulphur in the presence of hydrocarbon which reacts exothermally with sulphur in the reaction zone. In practice this can suitably be achieved by adding hydrogen to the hydrocarbon feed. The effect is that by the exothermic reaction of hydrogen with sulphur the required temperature may be obtained within the reaction zone while at the same time avoiding the need for excessive preheating of the sulphur.

Very good results are obtained in the process of the present invention when using a static catalyst bed, a procedure which requires rather simple apparatus and uncomplicated techniques. However, a moving burden or fluidised catalyst bed may be employed, if desired.

It is a surprising feature of the present invention that hydrocarbons containing 5 carbon atoms and more can be utilised in the catalysed reaction with sulphur at rather elevated temperature to give high conversions to carbon disulphide without the need for frequent regeneration of the catalyst. However, the invention does not preclude the refinements known in themselves to be useful in the general reaction of hydrocarbons with sulphur such as diluting the hydrocarbon feed with an inert gas such as nitrogen, using particular catalysts, preheating while avoiding premixing of the hydrocarbon and sulphur feed and using a stoichiometric excess of sulphur to hydrocarbon. Indeed such refinements are extremely useful in the present invention.

In the present invention there is no need to use superatmospheric pressure so that the care demanded in design and use of pressure equipment is avoided. The process is operated with very good results at substantially atmospheric pressure. In practice this is achieved by using no more than the very small pressure required to force the reactants through the reaction vessel.

The gaseous reaction product leaving the catalyst zone consists essentially of carbon disulphide, hydrogen sulphide, hydrocarbons and sulphur, from which the various constituents may be separated from one another. Thus the gases leaving the reaction zone may be cooled sufficiently to condense the sulphur which is then recycled to the process. From the residual gases carbon disulphide is either absorbed in a suitable medium such as a light oil fraction from which it is subsequently stripped, or alternatively carbon disulphide is condensed from the residual gases by further refrigeration. The hydrogen sulphide may be absorbed in a suitable medium such as aliphatic amines from which it is subsequently stripped. The hydrogen sulphide thus obtained may be converted to sulphur in a Claus furnace, this sulphur also being recycled to the process. In one manner of converting the hydrogen sulphide to sulphur in a Claus furnace part of the byproduct hydrogen sulphide is oxidised to sulphur dioxide and the latter material is then reacted with the residual by-product hydrogen sulphide to give sulphur; the sulphur doixide can however be derived from the burning of spent oxide and the sulphur dioxide is then reacted with by-product hydrogen sulphide to give sulphur. Alternatively the hydrogen sulphide by-product may be used as a raw material in other chemical processes such as, for example, in the manufacture of sodium sulphide.

The following examples illustrate but do not limit the invention.

Where percentages are mentioned they are by weight unless otherwise indicated. Percentages designated $v/v$ are volume percentages. The designation R.T.P. refers to standard temperature and pressure (0° C. and 1 atmosphere pressure) and this indicates the volume which the amount of gas referred to would have under these conditions.

Example 1

The hydrocarbon feed in this and the eight following examples was a petroleum distillate of average formula $C_6H_{14}$ consisting essentially of saturated aliphatic hydrocarbons but also containing about 2% $v/v$ of non-aliphatic hydrocarbons of which 1% $v/v$ is naphthenes, 0.3% to 0.8% $v/v$ is benzene, together with a trace of toluene. The material was of specific gravity 0.656 at 15.5/15.5° C. and 99% of the material distilled in the range 36.5° C. to 90° C. The hydrocarbon feed was vaporised and diluted with nitrogen. This material fed at a rate corresponding to 4 g./hr. of hydrocarbon (equivalent to 1.1 l./hr. at R.T.P.) and 11 l./hr. nitrogen (at R.T.P.) on the one hand, and sulphur vapour on the other hand at the rate of 42 g./hr. (equivalent to 14.7 l./hr. at R.T.P.) were separately introduced into the catalyst which consisted of potassium vanadate on silica gel. The catalyst occupied a volume of 50–60 ml. and the catalyst zone was maintained at a temperature of 900° C. The space velocity was 600 hr.$^{-1}$. A conversion efficiency based on hydrocarbons of 92% was realised over a period of 130 hours and at the end of this time there was no evidence of any deterioration in the conversion efficiency.

Example 2

The general procedure outlined in Example 1 was repeated except that the hydrocarbon feed was not diluted with nitrogen and the space velocity was 300 hr.$^{-1}$. A conversion efficiency of 95% was maintained over a period of 80 hours.

Example 3

The procedure outlined in Example 2 was repeated with the exception that the catalyst zone was maintained at a temperature of 700° C. A conversion efficiency of 75–80% was maintained over a period of 90 hours.

Example 4

The procedure outlined in Example 3 was repeated with the exception that the catalyst was a composition comprising potassium vanadate supported on corundum (analysing 0.8% K and 4.3% V). A conversion efficiency of 75% was maintained over a period of 40 hours.

Example 5

The process of Example 4 was repeated except that the catalyst was a composition comprising vanadium oxide supported on corundum, the composition containing sodium and potassium as an impurity only to the amount of 0.2% Na and <0.1% K. The conversion efficiency was 69% and carbon deposition in the catalyst chamber and in the exit gases was much greater than that observed in Examples 3 and 4.

Example 6

In this example the catalyst consisted of 60 g. of particles 0.5 cm. in their greatest dimension consisting of 20% by weight of a molybdenum oxide supported on gamma-alumina. The previously described hydrocarbon feed was vaporised and diluted with nitrogen. This material at the rate of 3.92 g./hr. of hydrocarbon (equivalent to 1.1 l./hr. at R.T.P.) with 11 l./hr. nitrogen on the one hand and sulphur vapour at the rate of 14.7 l./hr. (at R.T.P.) on the other hand were separately introduced into the reaction zone which was maintained at a temperature of 800° C. The space velocity was 535 hr.$^{-1}$. After a period of 43 hours a conversion efficiency of 91% based on the hydrocarbon feed was still being obtained.

Example 7

The general procedure of Example 6 was repeated but in this case the catalyst composition weighed 50 g. and comprised 8% by weight of nickel supported on alpha-alumina, the particle size of the catalyst being in this case 0.3 cm. to 0.5 cm. A conversion efficiency to carbon disulphide based on the hydrocarbon feed of 86% was still being maintained after 35 hours.

Example 8

The general procedure of Example 7 was repeated but in this case the catalyst composition weighed 20 g. and comprised 8% by weight of nickel supported on silica.

A conversion efficiency to $CS_2$ based on the hydrocarbon feed of 93% was still being maintained after 40 hours.

Example 9

The general procedure of Example 7 was repeated except that the catalyst composition weighed 44.7 g. and consisted of 2.5% by weight of cobalt and 14% by weight of molybdenum supported on gamma-alumina.

After a period of 29 hours a conversion efficiency to $CS_2$ based on the hydrocarbon feed of 82% was still being maintained.

Example 10

The hydrocarbon feed in this example was a petroleum distillate of average formula $C_{7.75}H_{15.9}$ which consists of 80% v/v of saturated aliphatic hydrocarbons, 14% v/v of naphthenes and 6% v/v of aromatic hydrocarbons, and less than 4% of olefinic hydrocarbons, which distillate has a specific gravity at 15.5/15.5 C. of 0.706, 99% of the material distilling in the range of 34° C. to 171° C. The general procedure of Example 1 was repeated except that the nitrogen flow rate was 0.1 l./hr. at R.T.P. and the catalyst zone was maintained at a temperature of 700° C. A conversion efficiency based on hydrocarbons of 83.3% was realised over a period of 40 hours.

What we claim is:

1. A process for the manufacture of carbon disulphide and by-product hydrogen sulphide which comprises reacting a preheated vaporised hydrocarbon feed which is liquid at normal atmospheric temperature, which is substantially completely vaporised at a temperature below 200° C. and which consists mainly of hydrocarbons having at least 5 carbon atoms in the molecule with the stoichiometric amount of sulphur vapour required to convert the carbon content of said hydrocarbon to carbon disulfide and the hydrogen content to hydrogen sulfide in the presence of a catalyst for conversion of hydrocarbon and sulfur to carbon disulfide by separately introducing the sulphur and the hydrocarbon feed into the catalyst, the catalyst zone being maintained at a temperature in the range 700° C. to 1300° C.

2. A process as claimed in claim 1 in which the reaction zone is maintained at a temperature in the approximate range 800° C. to 900° C.

3. A process as claimed in claim 1 in which the catalyst is potassium vanadate supported on a member of the group consisting of silica gel and corundum.

4. A process as claimed in claim 1 in which the reaction is carried out in the presence of hydrogen.

5. A process as claimed in claim 1 in which the hydrocarbon feed is one consisting mainly of hydrocarbon having at least 6 carbon atoms in the molecule.

6. A process as claimed in claim 1 in which the hydrocarbon feed is one containing a predominating amount of saturated aliphatic hydrocarbons.

7. A process as described in claim 6 in which the hydrocarbon feed is a low grade petroleum distillate.

8. A process as set forth in claim 4 in which the hydrogen is premixed with the hydrocarbon feed before the feed is mixed with sulfur vapor.

References Cited in the file of this patent

UNITED STATES PATENTS 2,187,393 Simo _____ Jan. 16, 194